(12) United States Patent
Bretagnol et al.

(10) Patent No.: US 11,079,592 B2
(45) Date of Patent: Aug. 3, 2021

(54) DEVICE FOR PROTECTING AN OPTICAL SENSOR AND DRIVING AID SYSTEM COMPRISING AN OPTICAL SENSOR

(71) Applicant: Valeo Systèmes d'Essuyage, Le Mesnil Saint Denis (FR)

(72) Inventors: Frédéric Bretagnol, Issoire (FR);
Giuseppe Grasso, Issoire (FR);
Grégory Kolanowski, Issoire (FR);
Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 284 days.

(21) Appl. No.: 16/321,268

(22) PCT Filed: Jul. 18, 2017

(86) PCT No.: PCT/EP2017/068138
§ 371 (c)(1),
(2) Date: Jan. 28, 2019

(87) PCT Pub. No.: WO2018/019662
PCT Pub. Date: Feb. 1, 2018

(65) Prior Publication Data
US 2019/0162953 A1    May 30, 2019

(30) Foreign Application Priority Data

Jul. 28, 2016 (FR) ........................................ 1657320

(51) Int. Cl.
*G02B 1/00* (2006.01)
*G02B 27/00* (2006.01)
(Continued)

(52) U.S. Cl.
CPC .......... *G02B 27/0006* (2013.01); *B08B 3/041* (2013.01); *B08B 17/06* (2013.01);
(Continued)

(58) Field of Classification Search
CPC ....... G02B 27/0006; B08B 3/04; B08B 17/06; B60S 1/56; B60R 2300/10;
(Continued)

(56) References Cited

U.S. PATENT DOCUMENTS 8,899,761 B2    12/2014    Tonar et al.
10,096,124 B2 *  10/2018   Hayakawa ............. G08G 1/166
(Continued)

FOREIGN PATENT DOCUMENTS

DE    102008027430 A1    2/2009
EP         2873571 A1    5/2015
(Continued)

OTHER PUBLICATIONS

Notification of Reason for Rejection in corresponding Japanese Application No. 2019-504012, dated Dec. 10, 2019 (11 pages).
(Continued)

*Primary Examiner* — Euncha P Cherry
(74) *Attorney, Agent, or Firm* — Osha Bergman Watanabe & Burton LLP

(57) ABSTRACT

The present invention relates to a device 3 for protecting an optical sensor 13 for an automotive vehicle that is intended to be attached to the optical sensor, characterized in that the device includes:—a transparent optical element 9 exhibiting rotational symmetry and being rotatably mounted about an axis of rotation, configured to be positioned upstream of the optical sensor 13 so that the axis of rotation of the optical element 9 is merged with the optical axis 15 of the optical sensor 13; and—an actuator 5 that is coupled to the optical
(Continued)

Figure 1:
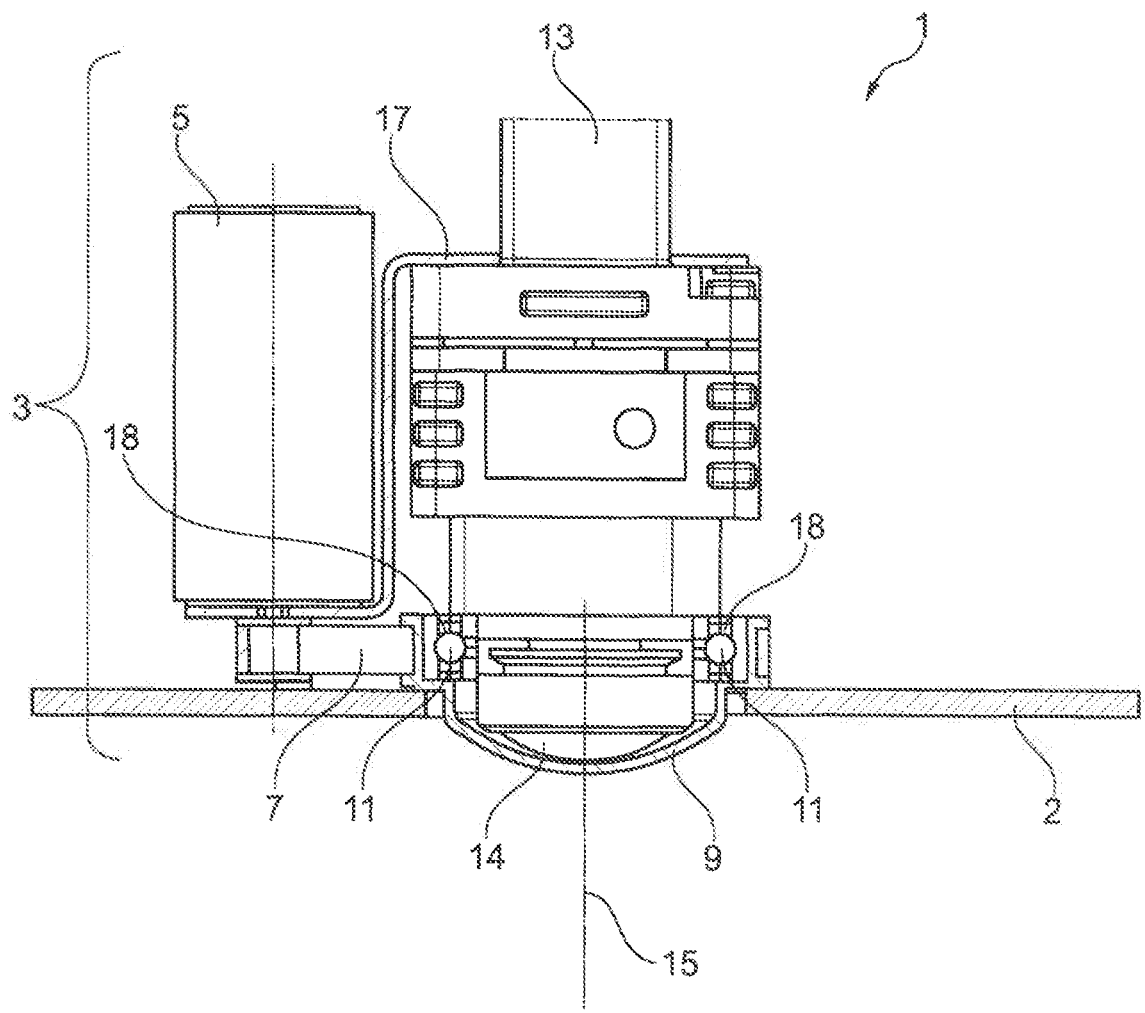

element 9 so as to rotate the optical element 9 in order to allow soiling to be removed by a centrifugal effect.

16 Claims, 4 Drawing Sheets

(51) Int. Cl.
  *B08B 17/06*   (2006.01)
  *B60S 1/56*    (2006.01)
  *B08B 3/04*    (2006.01)

(52) U.S. Cl.
  CPC ............ *B60S 1/56* (2013.01); *B60R 2300/10* (2013.01); *B60R 2300/804* (2013.01); *B60R 2300/806* (2013.01); *B60R 2300/8093* (2013.01)

(58) Field of Classification Search
  CPC ........ B60R 2300/804; B60R 2300/806; B60R 2300/8093
  USPC ......................................... 359/509
  See application file for complete search history.

(56) References Cited

U.S. PATENT DOCUMENTS

| | | | |
|---|---|---|---|
| 2011/0181725 A1* | 7/2011 | Matsuura | G03B 17/02 348/148 |
| 2012/0000024 A1 | 1/2012 | Layton | |
| 2015/0151722 A1 | 6/2015 | Gokan et al. | |

FOREIGN PATENT DOCUMENTS

| | | |
|---|---|---|
| FR | 2841488 A1 | 1/2004 |
| GB | 2299560 A | 10/1996 |
| JP | H02-216351 A | 8/1990 |
| JP | 2011-155468 A | 8/2011 |
| WO | 2006-060868 A2 | 6/2006 |
| WO | 2014-010580 A1 | 1/2014 |

OTHER PUBLICATIONS

International Search Report and Written Opinion Issued in Corresponding PCT Application No. PCT/EP2017/068138, dated Nov. 7, 2017 (12 Pages with English Translation of International Search Report).

\* cited by examiner

DEVICE FOR PROTECTING AN OPTICAL SENSOR AND DRIVING AID SYSTEM COMPRISING AN OPTICAL SENSOR

The present invention relates to the field of driver assistance, and notably to driving aid systems fitted in some vehicles, the driving aid system possibly comprising an optical sensor, for example a camera comprising a lens. More particularly, the invention concerns a device for protecting such an optical sensor, the optical sensor possibly being placed inside a bodywork part of a motor vehicle, for example.

Front, rear or side view cameras are fitted to many motor vehicles at the present time. Notably, such cameras form part of driving aid systems such as parking aid systems or line crossing detection systems.

There are cameras that are fitted inside the passenger compartment of a vehicle for assistance in parking. These cameras are well protected from weather hazards and from soiling caused by organic or mineral contaminants. However, the angle of view for such cameras fitted inside the passenger compartment is not optimal, particularly for a parking aid, since they do not provide a view of obstacles located near the rear of the vehicle, for example.

It is therefore preferable to install these driving aid systems, and notably their cameras, on the outside of vehicles at various locations, depending on their intended use. In such a case, the driving aid system, and particularly the camera of such a system, is highly exposed to weather hazards and to projections of mineral or organic soiling that may reduce its effectiveness or even render it inoperative.

To counteract the deposition of soiling on the driving aid system, there is a known way of arranging a device for cleaning the optical component of the camera, usually a cleaning liquid spray located near the camera, for eliminating contaminants that have been deposited over time.

However, the use of these sprays increases the operating costs of such a driving aid system, because they require the use of rather large amounts of cleaning liquid.

On the other hand, the optical component of the camera, usually consisting of a lens, is a relatively fragile device. It must therefore be protected against projections that might damage it. Consequently, such cameras are commonly housed in protective casings comprising a protective window arranged facing the lens. However, the cleaning of the lens, or of the window in the casing that protects it, is of major importance for the correct operation of the camera.

The document FR2841488 discloses such a casing enclosing an optical sensor with means for cleaning the casing, composed of a spray and means for causing the vibration of a window facing the camera.

However, this device may be too bulky in some cases, notably when it is to be fitted on the vehicle's number plate, on the front or rear bumpers, or on the rear-view mirrors. Furthermore, this device only allows the cleaning liquid to flow over the window, and its effectiveness for stubborn and encrusted soiling may be limited in spite of the vibration of the glazing and the catalytic treatment that the latter has undergone.

To enable this driving aid system to be fitted at any useful point on the vehicle, it is possible to dispense with the protective casing comprising cleaning means as described above. In this case, a smaller protective casing, adapted to the size of the optical sensor, must be provided to protect the sensor. It is also necessary to provide means for cleaning the optical component of the driving aid system in order for it to exhibit good operating conditions, for example the capture of clear and clean images, which appears to be difficult if the optical component of such a system is contaminated by organic or mineral contaminants or by traces of water. The document U.S. Pat. No. 8,899,761 discloses such a protective casing, which is designed to receive an optical sensor such as a camera for a motor vehicle, and is designed to be installed on the outside of the vehicle. The protective casing described in this document comprises an outer fixed cover for protecting the camera lens, and a piezoelectric transducer for causing the assembly to vibrate and thus allowing soiling to fall from the cover.

However, such a vibration of the assembly greatly increases the risks of fracture and/or cracking of the material from which the camera lens is made, or of the cover sealing the protective casing in which the camera is located. It is therefore necessary to use glasses or plastics which are highly resistant to impact and vibration, and are free of manufacturing flaws, for making these elements. This constraint increases the manufacturing costs of such systems, since glasses and plastics capable of withstanding these mechanical stresses are usually expensive, and the necessary freedom from flaws may increase the rejection rate of components. Moreover, the vibrations of the assembly may damage the internal system of the camera, particularly its electronic components.

For the purpose of installing the driving aid system on the outside of the vehicle without the need for a protective casing, there is a known way of installing these systems inside certain bodywork parts, such as the rear-view mirrors or the front or rear bumpers, so that they project slightly from these bodywork parts. The camera lens is usually covered with a protective cover to provide it with protection against projections and/or impact. A cleaning system must also be provided for such installations. The document US2012/0000024 discloses a device for protecting an optical sensor installed in this way. This protection device comprises a transparent disc mounted rotationally in a casing. The casing comprises cleaning pads and a heating element for de-icing the transparent disc. The outer casing may also comprise a wiper blade for removing solid soiling that may be deposited on the rotating disc. The rotating disc fitted to this protection device has a larger diameter than the camera lens, usually at least twice as large, its axis of rotation being offset from the optical axis of the camera.

However, such a protection device does not enable the optical sensor to have a wide field of vision, because the optical sensor is located behind this casing. Thus the thickness of the casing makes it difficult to obtain a wide field of vision for such an optical sensor. For optimal operation, such a driving aid system must provide a wide field of vision. Moreover, it may be difficult to clean the pads, because they may become clogged and/or moldy as a result of the humidity, the temperature, and any residual soiling deposited on them. Furthermore, the transparent disc may have micro-scratches caused by small residues that may become jammed between the wiper and the transparent disc, and this would impede the correct operation of the optical sensor installed in such a casing, since these micro-scratches may harm the quality of the image.

Additionally, the document DE102008027430 discloses a device for protecting an optical sensor using a rotating cover which has hydrophobic properties and/or enables the adhesion of soiling to the cover to be limited, this cover being designed to be made to rotate by an electric motor. The protection device also comprises a nozzle for projecting a cleaning liquid, a washing element which may be a wiper blade, and a drying element.

However, such a protection device may be noisy if the cover is made to rotate at high speeds, notably as a result of the friction between the cover and the wiper blade. Moreover, the cleaning and drying elements may be subject to premature wear due to the continuous rotation of the cover at a rather high speed. Additionally, such a protection device may be rather bulky to install, since the rotating cover is offset relative to the optical sensor and has a diameter at least twice as great as the diameter of the optical component of the optical sensor that it protects and whose correct operability it ensures. It is also possible for micro-scratches to appear on the cover if solid particles are deposited between the wiper and the rotating cover. This may cause the field of view and the quality of the images captured by the optical sensor to be affected as before. Finally, the use of such a protection system makes it impossible to have a wide field of vision, because of the arrangement of the optical sensor within a casing carrying the cover, without creating a projection from this casing.

The present invention aims to overcome, at least partially, the aforementioned drawbacks of the prior art, by proposing a device, projecting from the sensor, for protecting the optical component of an optical sensor, such as the lens of a camera.

Another object of the present invention is to propose a protection device for fast and effective cleaning of the lens.

The present invention also has the object of proposing a protection device for reducing the amounts of cleaning fluid required to clean the optical component.

For this purpose, the invention proposes a device for protecting an optical sensor for motor vehicles which is designed to be fixed to the optical sensor, characterized in that the device comprises:

a transparent optical element having a symmetry of revolution and mounted rotatably around an axis of rotation, the optical element being configured to be arranged upstream of the optical sensor so that the axis of rotation of the optical element coincides with the optical axis of the optical sensor, and an actuator coupled to the optical element for making the optical element rotate, enabling soiling to be removed by a centrifugal effect.

Thus the protection device may be installed on an optical sensor to be installed inside a bodywork part of the vehicle, or alternatively on the outside of the vehicle, while allowing the optical sensor to retain a wide field of vision.

The term "soiling" is taken to mean drops of water as well as organic or mineral contaminants.

In rainy or dry weather, there is a risk that soiling may be deposited on the optical element and may impede the correct operation of the optical sensor. When the optical element is made to rotate at a relatively high speed by means of the actuator, any soiling is ejected by a centrifugal effect. This is because the work of the centrifugal force created in this way is greater than the force of adhesion of the soiling to the optical element. Thus the optical sensor continues to be operable in the correct way, and its clogging is limited, regardless of the weather conditions. Thus the driving aid system maintains a good level of visibility.

The device for protecting the optical sensor according to the invention may also have one or more of the following characteristics, considered individually or in combination:

The actuator comprises an electric motor, such as a brushless motor, for driving the optical element.

The electric motor is configured to make the optical dement rotate at a speed of between 1000 and 50000 r.p.m., preferably between 5000 and 20000 r.p.m., and even more preferably between 7000 and 15000 r.p.m.

The actuator is coupled to the optical element by coupling means chosen from the following list: a belt, gearing, a resilient drive cylinder, and a roller.

The optical element has an outer surface having at least one of the properties chosen from the following list: hydrophobic, photocatalytic, superhydrophobic, oleophobic, hydrophilic, and superhydrophilic.

According to a variant, the optical element is formed by an outer lens of the objective lens of the optical sensor.

According to another variant, the optical element is separate from the objective lens of the optical sensor.

According to this second variant, the optical element is connected to a fixing frame configured to receive the optical sensor.

According to this second variant, the optical element may be flat.

According to this second variant, the optical element may be convex.

The device for protecting the optical sensor comprises at least one nozzle for projecting a fluid onto the optical element.

According to a variant, the fluid is compressed air.

According to another variant, the fluid is a cleaning liquid.

The device for protecting the optical sensor comprises at least one bearing configured for the rotation of the optical element relative to the optical sensor.

The invention also proposes a driving aid system comprising an optical sensor, said driving aid system further comprising a device for protecting the optical sensor as described above, and an electronic control unit configured to activate the actuator in order to make the optical element rotate.

Thus the driving aid system comprising at least one camera may be installed on any bodywork part and can provide a wide angle of view. Furthermore, the field of view of the camera cannot be adversely affected by the presence of soiling. The operation of the optical sensor forming this driving aid system is therefore improved.

The driving aid system may also have one or more of the following characteristics, considered individually or in combination:

According to a variant, the electronic control unit is configured to activate the actuator so as to make the optical element rotate constantly during the operation of the vehicle.

According to another variant, the electronic control unit is configured to activate the actuator so as to make the optical element rotate intermittently during the operation of the vehicle.

The electronic control unit is configured to control the actuator so as to adapt the rotation speed of the optical element according to the speed of movement of the motor vehicle.

The actuator is configured to reduce the rotation speed of the optical element as the speed of the vehicle increases, when the optical element is installed at the front of the vehicle.

According to a variant, the electronic control unit is configured to actuate the projection of at least one fluid, such as cleaning liquid or compressed air, onto the optical element when the optical sensor detects the presence of soiling in its field of view.

According to another variant, the electronic control unit is configured to actuate the projection of two different fluids, such as cleaning liquid and compressed air, consecutively.

The protection device comprises a capacitive proximity sensor connected to the electronic control unit and configured to detect the approach of another object in the proximity of the optical element, and to enable the electronic control unit to command the automatic stopping of the actuator, in order to halt the rotation of the optical element if another object approaches.

Thus, by consecutively rotating the optical element and projecting fluid onto it, the optical element can be cleaned effectively and the operability of the optical sensor can be good, regardless of the weather conditions. In fact, stubborn soiling may be deposited on the optical element when the vehicle is parked. By using cleaning and/or compressed air in addition to the centrifugal effect, this stubborn soiling is removed from the optical element. By combining fluid projection with the rotation of the optical element, therefore, a cleaning system for the optical element of the optical sensor can be created.

Figure 2:
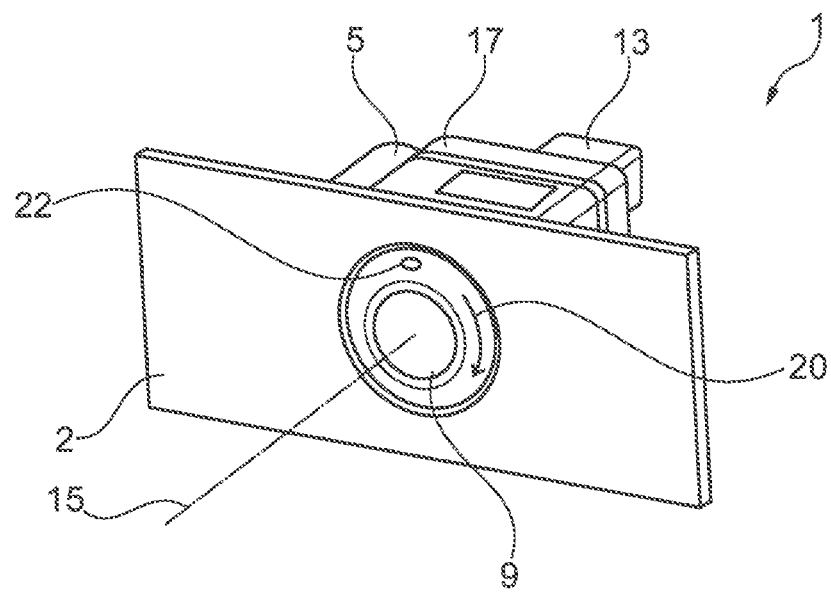
Figure 3:
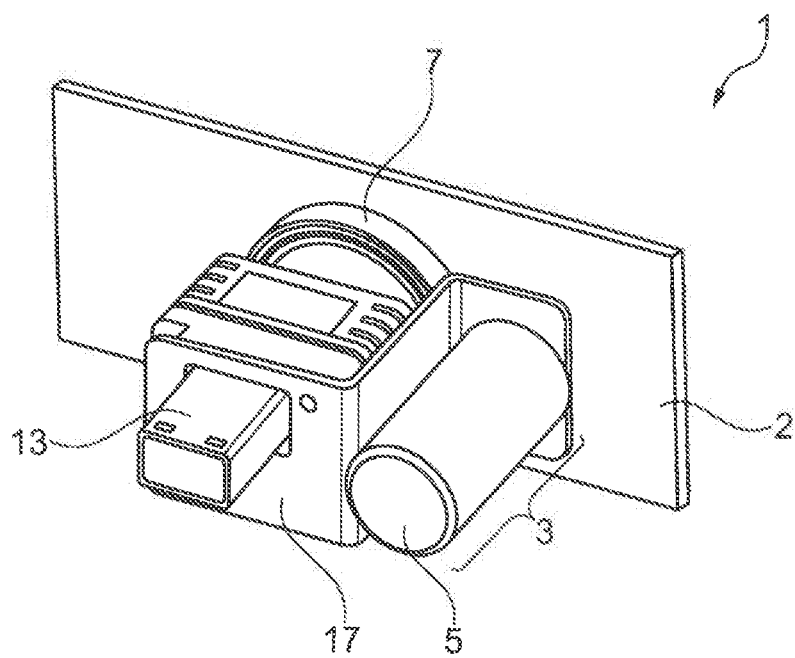
Figure 4:
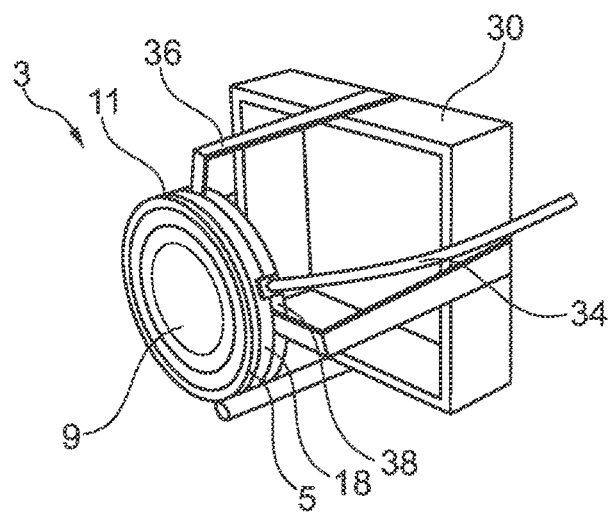
Figure 5:
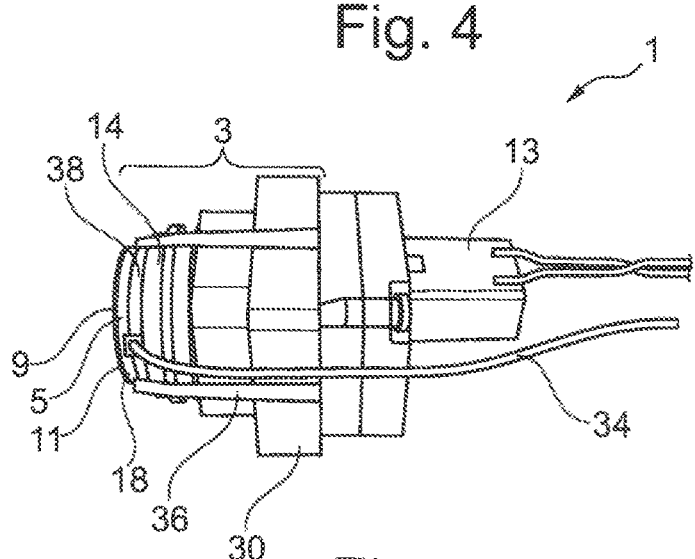
Figure 6:
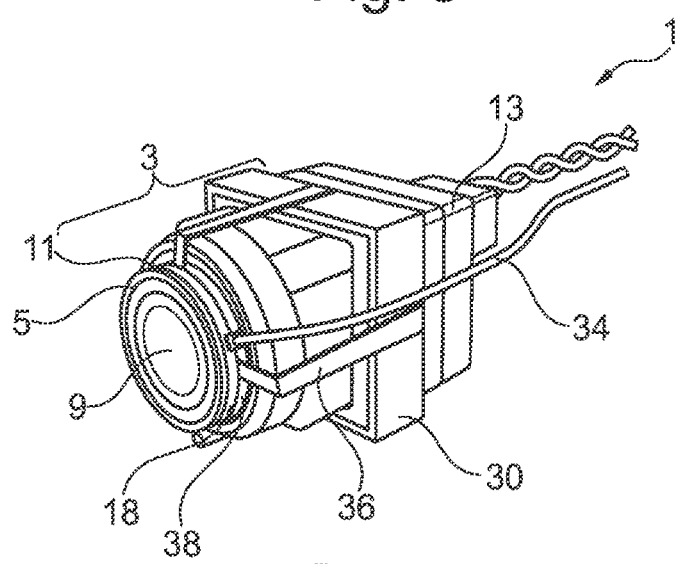
Figure 7:
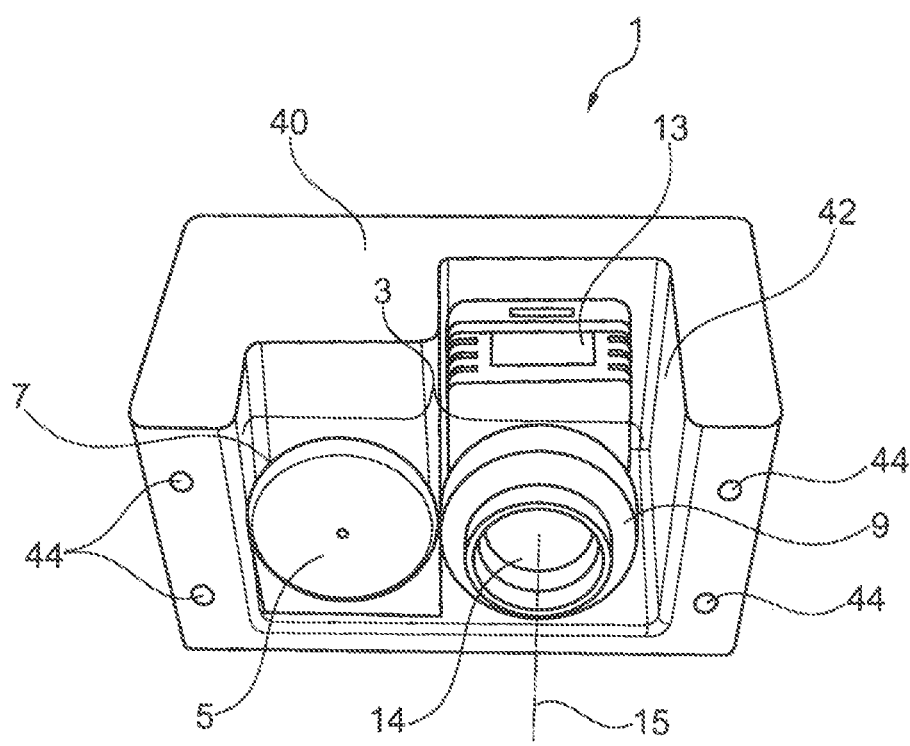

Other advantages and features of the invention will be apparent from a perusal of the description of the invention and the attached drawings, in which:

FIG. 1 is a perspective view of a longitudinal section through the driving aid system according to a first embodiment, FIG. 2 is a schematic front view of the driving aid system installed in a bodywork part of the vehicle, FIG. 3 is a schematic rear view of the driving aid system installed in a bodywork part of the vehicle, FIG. 4 is a schematic view of the device for protecting the optical sensor according to a particular embodiment, FIG. 5 is a schematic longitudinal view of the driving aid system according to the particular embodiment of FIG. 4, FIG. 6 is a schematic perspective view of the driving aid system according to the particular embodiment of FIG. 4, and FIG. 7 is a schematic view of the driving aid system according to another embodiment.

In these figures, identical elements bear the same reference numerals.

The following embodiments are examples. Although the description refers to one or more embodiments, this does not necessarily mean that each reference concerns the same embodiment, or that the characteristics are applicable to a single embodiment only. Simple characteristics of different embodiments may also be combined or interchanged to provide other embodiments.

In the following description, reference is made to a first and a second nozzle. This is a simple form of indexing for the purpose of differentiating and designating elements which are similar but not identical. This indexing does not imply that any element takes priority over another, and such designations may easily be interchanged without departing from the scope of the present description. Furthermore, this indexing does not imply any ordering. In time for example, for the purpose of understanding the operation of the device for cleaning the optical sensor.

In the following description, "upstream" is defined by the direction of the light radiation, that is to say from the outside toward the inside of the optical sensor. Additionally, in the following description, "convex" is taken to mean "curved toward the outside of the optical sensor".

In the following description, "soiling" is taken to mean drops of water as well as traces of water, organic or mineral contaminants, or a combination of these different elements.

With reference to FIG. 1, the invention concerns a driving aid system 1 which is, notably, installed in a bodywork part 2 of a motor vehicle. The driving aid system comprises a device 3 for protecting an optical sensor 13 for a motor vehicle, such as a camera having an optical component 14, a lens for example. The protection device 3 according to this embodiment is designed to be fixed to the optical sensor 13.

The protection device 3 further comprises a transparent optical element 9 and an actuator 5.

The optical element 9 has a symmetry of revolution and is mounted rotatably around an axis of rotation which coincides with the optical axis 15 of the optical sensor 13, the axis of revolution of the optical element 9 also being the axis of rotation of the latter. According to this embodiment, the optical element 9 is configured to be arranged upstream of the optical sensor 13 to protect the latter from soiling.

The actuator 5 is coupled to the optical element 9 with the aid of coupling means 7 for making the optical element 9 rotate, so as to enable soiling to be removed by a centrifugal effect. This is because the centrifugal force to which the soiling will be subjected as a result of the rotation of the optical element 9 is greater than the adhesion of this soiling to the optical element 9. Thus the soiling is ejected from the optical element 9 and does not interfere with the field of view of the optical sensor 13.

According to this particular embodiment, the actuator 5 of the protection device 3 is designed to be fixed to the optical sensor 13 by means of a mounting 17.

According to this embodiment, the actuator 5 comprises an electric motor, more particularly a brushless motor, for driving the optical element 9. The electric motor forming the actuator 5 is configured to make the optical element 9 rotate at a speed of between 1000 and 50000 r.p.m., preferably between 5000 and 20000 r.p.m., and even more preferably between 7000 and 15000 r.p.m. Such rotation speeds are sufficient for removing the soiling deposited on the optical element 9 by a centrifugal effect, thus keeping the optical component 14 of the optical sensor 13 in a state of cleanliness which is ideal for ensuring the improved operation of the driving aid system 1.

To ensure that the operation of the driving aid system 1 is improved, it is also necessary to limit the possible adhesion of organic or mineral contaminants, as well as the presence of traces of water on the optical element 9. For this purpose, the optical element 9 has an outer surface having one or more of the following properties: hydrophobic, photocatalytic, superhydrophobic, oleophobic, hydrophilic, or superhydrophilic, or any other surface treatment for reducing the adhesion of soiling. Because of the hydrophobic properties of the outer surface of the optical element 9, the water can only flow over this element without leaving any traces, since the water will be unable to adhere to it. Moreover, the photocatalytic properties of the outer surface of the optical element 9 limit the possible adhesion of organic or mineral contaminants to it. Thus the composition of the optical element 9 makes it possible to limit the presence of traces that may adversely affect the correct operation of the driving aid system 1.

Advantageously, a liquid solution (such as Rain-X®, for example) may be deposited (periodically and manually) on the outer surface of the optical element 9 to form a hydrophobic film.

Optionally, a demisting treatment may be applied to the inner surface of the optical element 9 to prevent any phenomenon of condensation between the outer lens of the optical component 14 and the inner surface of the optical element 9.

According to the embodiment described here, the optical element 9 is positioned facing, and more precisely upstream of, the optical component 14 of the optical sensor 13, being centered relative to the optical component and covering the whole surface area of this lens. Thus, the camera lens is protected from any projections of organic or mineral contaminants or water that might damage it. Additionally, the treatments carried out on the optical element 9 provide improved operation of this camera.

According to the embodiment described here, the optical element 9 has a similar diameter to that of the optical component 14 of the optical sensor 13. Thus the protection device 3 may easily be installed on any type of optical sensor 13, since its size is adapted to that of the optical sensor 13.

According to the particular embodiment of FIG. 1, the optical element 9 is separate from the optical sensor 13. Additionally, the optical element 9 is positioned upstream of the optical component 14 of the optical sensor 13.

According to the embodiment of FIG. 1, the optical element 9 may, for example, be a protective glass. The optical element 9 is designed to protect the optical component 14 of the optical sensor 13 from any projections of solid debris that might damage this optical component 14. According to this embodiment, the optical element 9 which is separate from the optical sensor 13 is convex. However, the optical element 9 which is separate from the optical sensor 13 may, according to another embodiment not shown here, be flat.

According to another embodiment not shown here, the optical element 9 may be formed by an outer lens of the optical component 14 of the optical sensor 13. In such a case, the optical sensor 13 comprises an integrated actuator 5 for making the optical element 9 rotate. In this case, the optical element 9 is mounted rotatably on the optical sensor 13, for example with the aid of at least one bearing 11 positioned on a fixed element of the optical sensor 13. By way of example, in this case the fixed element of the optical sensor 13 may be made in the form of a ring integrated into the optical sensor 13.

According to the particular embodiment described here, and in a non-limiting way, the means 7 for coupling the actuator 5 and the optical element 9 consist of a belt.

Alternatively, the coupling element 7 may be gearing, a resilient drive cylinder, or a roller, as shown in FIG. 7.

According to another embodiment not shown here, the optical element may be made to rotate with the aid of a magnetic system comprising two complementary elements, carried by the bearing 11 on the one hand and by the optical element 9 on the other hand.

Advantageously, according to this embodiment, there is no contact between the various parts which make the optical element 9 rotate. Thus the wear of the coupling element 7 may be limited.

According to the embodiment shown in FIG. 1, the protection device 3 comprises at least one bearing 11, or rotary mounting, configured for making the optical element 9 rotate relative to the optical sensor 13. The inner ring of the bearing 11 is in contact with en outer surface of the optical sensor 13, and the outer ring is in contact with the optical element 9, which is in contact with the coupling element 7. According to a variant embodiment, the bearing 11 is arranged between the optical element 9 and a fixed ring 18 integrated into the protection device 3 and configured to receive the objective lens of the optical sensor 13. This fixed ring 18 has an opening of sufficient diameter to allow the lens 14 of the optical sensor 13 to pass through the ring 18 and to allow the objective lens of the optical sensor 13 to bear on the inside. The bearing 11 is configured for making the optical element 9 rotate relative to the fixed ring 18 and therefore relative to the optical sensor 13 when the latter is fitted with the protection device 3. According to this particular embodiment, the protection device 3 comprises a bearing 11, which may be a ball bearing, for example.

In operation, the actuator 5 makes the optical element 9 rotate relative to the optical sensor 13, using the coupling means 7. This rotation is possible because of the presence of the bearing 11.

With reference to FIG. 1, the driving aid system 1 projects from an opening located in a bodywork part 2. Thus the optical component 14 and the optical element 9 project from this opening and allow the driving aid system 1 to have a wide field of vision while maintaining good operating conditions and effective protection of the optical component 14, because of the protection device 3 described above.

With reference to FIGS. 2 and 3, the driving aid system 1 is shown as being installed inside a bodywork part 2 of a motor vehicle.

With reference to FIGS. 2 and 3, the driving aid system 1 is fixed inside the bodywork part 2 by any method known to those skilled in the art, for example a clip system, a screw system, or an adhesive system.

In FIG. 2, the arrow 20 shows the direction of rotation of the optical element 9. In this case, the direction of rotation is clockwise. However, this rotation could take place in the anti-clockwise direction in another embodiment not shown here.

The driving aid system 1 comprises at least one nozzle 22 for projecting a fluid onto the optical element 9. According to the embodiment described here, the driving aid system 1 comprises a nozzle 22 for projecting a fluid onto the optical element 9.

This nozzle 22 is located, in this representation and in a non-limiting way, above the optical element 9. However, according to other embodiments not shown here, the nozzle 22 may be located anywhere in the proximity of the optical dement 9.

The fluid projected by the nozzle 22 may be compressed air or a cleaning liquid, to clean the optical dement 9 if the rotation of the latter is insufficient to remove the various types of soiling deposited on it. Alternatively, the projection of fluid may be used in addition to the rotation of the optical dement 9 to improve the state of cleanliness of this element.

On the other hand, according to other embodiments not shown here, the protection device 3 may comprise a plurality of nozzles. The protection device 3 may, for example, comprise a first nozzle 22 configured to project a first fluid such as cleaning liquid, and a second nozzle configured to project a second fluid such as compressed air, onto the optical dement 9.

According to the embodiment of FIG. 2, the nozzle is connected to the cleaning liquid distribution system of the vehicle.

According to another embodiment not shown here, the protection device 3 may comprise its own dedicated reservoir for cleaning liquid. In this case, this driving aid system 1 may be installed relatively easily inside any bodywork part 2 of the motor vehicle, for example the front or rear bumpers, or alternatively the rear-view mirrors, without the need for a lengthy and complex initial design process at the vehicle level for connecting the protection device 3 to the cleaning liquid system of the vehicle in order to supply the nozzle 22. In this configuration, this protection device 3 may also be installed easily on any optical sensor 13 located on the outside of the vehicle.

With reference to FIG. 4, the protection device 3 shown here is designed to receive an optical sensor 13 as shown in FIGS. 5 and 6, to form the driving aid system 1.

According to the embodiment of FIG. 4, the optical element 9 is connected to a mounting, made in the form of a fixing frame 30 for example, configured to receive the optical sensor 13. For this purpose, an opening is provided in the fixing frame 30. This opening is configured to receive the optical sensor 13.

According to an embodiment not shown here, the fixing frame 30 may have adjusting means such that the opening can be adapted to different camera casings of different sizes.

According to the embodiment of FIG. 4, the protection device 3 comprises straps 36 which are fixed to the fixing frame 30, for connecting the fixing frame 30 to the optical element 9. These straps 36 are, for example, connected to a bearing plate 38 of substantially circular shape, as shown in FIG. 4, and configured so that the objective lens of the optical sensor 13 bears on it, as shown in FIGS. 5 and 6. This bearing plate 38 may carry the fixed ring 18, the bearing 11 and the optical element 9. According to this embodiment, the actuator 5 is positioned in contact with the optical element 9.

According to another embodiment not shown here, the straps 36 may also be adjustable, or resilient, so that they can be adapted to any type of optical sensor 13.

According to the embodiment of FIGS. 5 and 6, the optical component 14 of the optical sensor 13 is in contact with the bearing plate 38 which carries the fixed ring 18, the bearing 11, the actuator 5 and the optical element 9. Thus the optical component 14 is protected from any solid projection that might damage it.

According to another embodiment not shown here, the fixed ring 18 and the bearing plate 38 may be the same component.

According to the particular embodiment of FIGS. 4 to 6, the actuator 5 is supplied with electricity by a power supply 34 connected to the main electrical circuit of the vehicle.

FIG. 7 shows an embodiment which is an alternative to FIGS. 4 to 6. According to this alternative, the driving aid system comprises a block 40, to be installed inside a bodywork part, on which block the protection device 3 is fixed. The block 40 comprises a housing 42 configured to receive the optical sensor 13, the optical element 9 being positioned at an opening in the housing 42 for the passage of the optical component 14 of the optical sensor 13. The block 40 also comprises holes 44 for fixing this block 40 inside a bodywork part. According to the embodiment shown in FIG. 7, the block 40 comprises four holes 44.

Additionally, the coupling element 7 may comprise a ring having a friction coefficient chosen to be high enough to transmit the rotary movement of the actuator 5 to the optical element 9, in the manner of a roller, for example.

According to this particular embodiment, the motor providing the movement of the actuator 5 is positioned inside the block 40.

According to another embodiment not shown here, the motor providing the movement of the actuator 5 may be positioned outside the block 40.

Additionally, when the block 40 has been installed inside the bodywork part, the optical component 14 of the optical sensor 13 and the optical element 9 project from an opening present in the bodywork part, in a similar way to that described with reference to FIGS. 1 and 2.

According to a particular embodiment not shown here, the block 40 is directly connected to the electrical system of the vehicle to supply the actuator 5.

According to another particular embodiment not shown here, the block 40 may comprise at least one plug for connecting the optical sensor 13 inside the housing 42. This plug may be used to supply electricity to the optical sensor 13 and to transmit the images captured by the latter.

The driving aid system 1 therefore comprises an optical sensor 13 comprising a protection device 3 as described above, and an electronic control unit, not shown here, which is notably configured to activate the actuator 5 in order to make the optical element 9 rotate.

According to the embodiment described here, the actuator 5 is activated by the electronic control unit in such a way that the optical element 9 is made to rotate constantly during the operation of the vehicle.

According to another embodiment, the electronic control unit is configured to activate the actuator 5 so as to make the optical element 9 rotate intermittently during the operation of the vehicle. According to this embodiment, the electronic control unit may, for example, cause the actuator 5 to be started when the user of the vehicle uses a function of the vehicle which requires the operation of the optical sensor 13, for example if he engages reverse gear when the driving aid system 1 is installed to provide a view from the rear of the vehicle to facilitate its parking.

Advantageously, the electronic control unit is configured to control the actuator 5 so as to adapt the rotation speed of the optical element 9 according to the speed of movement of the motor vehicle. This is because the soiling is removed from the optical element 9 by the effect of the centrifugal force created by the rotation of this optical element 9, possibly in combination with the friction created by the movement of the vehicle, particularly when the driving aid system 1 is located at the front of the vehicle. Thus, as the speed of movement of the vehicle increases, it becomes less necessary for the rotation speed of the optical element 9 to be high in order to maintain a good state of cleanliness of the optical element 9, resulting in improved operation of the optical sensor 13. Thus the electronic control unit will act on the actuator 5 so that it reduces the rotation speed of the optical element 9 as the speed of the vehicle increases, notably when the optical element 9 is installed at the front of the vehicle.

According to a particular embodiment, the electronic control unit is configured to make the rotation speed of the optical element 9 vary. This variation of the rotation speed may result in a change of the direction of rotation of the optical element 9. Advantageously, the electronic control unit modifies the direction of rotation of the optical element 9 several times in the course of a fairly brief time interval. This change in the direction of rotation promotes the appearance of acceleration phenomena, and can effectively remove the small water drops located substantially in the center of the optical element 9, for example. This is because the variation in the direction of rotation of the optical element 9 subjects the soiling to acceleration in the opposite direction to that of the movement of the soiling, thereby facilitating its loss of adhesion to the optical element 9 and consequently its ejection from it.

Alternatively or additionally, the electronic control unit is controlled so as to make the rotation speed of the optical element 9 vary in order to create acceleration which promotes the detachment of the soiling located on the optical element 9.

During the operation of the protection device 3, the electronic control unit is configured to actuate the projection of at least one fluid, such as cleaning liquid or compressed air, onto the optical element 9, using the nozzle 22, when the optical sensor 13 detects the presence of soiling in its field of view, for example.

According to a particular embodiment, the electronic control unit is configured to actuate the projection of compressed air onto the optical element 9 when the vehicle is stationary or when it is moving slowly, that is to say at a speed of less than 15 km/h, for example. This is because, in such a case, the aerodynamic forces are too weak to be coupled effectively with the centrifugal force of the rotation of the optical element 9 to remove the drops of water and/or the soiling that may be deposited on the optical element 9. Moreover, at low speed or when the vehicle is stationary, the small drops of water located at the center or near the center of the optical element 9 may be difficult to remove, because the rotation speed of the center of the optical element 9 may be too low to eject them. Advantageously, the projection of compressed air onto the optical element 9 can compensate for the absence of aerodynamic forces when the vehicle is moving slowly or when it is stationary.

According to another embodiment, the electronic control unit may be configured to actuate the projection of cleaning liquid and/or compressed air after a certain period.

According to yet another embodiment, the electronic control unit may be configured to actuate the projection of cleaning liquid and/or compressed air when commanded by the user of the vehicle.

The electronic control unit is configured, according to some embodiments, to actuate the projection of cleaning liquid and compressed air consecutively.

According to a particular embodiment, when the optical sensor 13 detects the presence of soiling in its field of view despite the centrifugal effect, the control unit may stop the actuator 5 in order to haft the rotation of the optical element 9. The electronic control unit then commands the projection of cleaning liquid by the nozzle 22, in order to detach the soiling, for example. The electronic control unit then commands the projection of compressed air by the same nozzle 22 or by a second nozzle, not shown here, in order to remove any soiling encrusted on the optical element 9. The electronic control unit then reactivates the actuator 5 to make the optical element 9 rotate again at a given rotation speed, which may be higher or lower than the rotation speed of the optical element 9 during the normal operation of the protection device 3. The projection of compressed air may be carried out before, simultaneously with, or after the restarting of the rotation of the optical element 9 according to this embodiment.

Advantageously, the protection device 3 comprises a proximity sensor, not shown here, connected to the electronic control unit. Such a proximity sensor may be, for example, a capacitive proximity sensor. The capacitive proximity sensor is configured to detect the approach of another object in the proximity of the optical element 9. In such a case, the capacitive proximity sensor transmits this information to the electronic control unit, enabling the latter to command the automatic halting of the actuator 5, in order to stop the rotation of the optical element 9 if another object approaches. Thus the optical element 9 projecting from the bodywork part 2 cannot be damaged if it comes into contact with an object as a result of its rotation, particularly when the driving aid system 1 is to be installed at the front or rear bumpers of the vehicle.

Optionally, it is also possible to provide elements for limiting the noise of the motor, in order not to inconvenience the passengers inside the vehicle or the other users when the protection device 3 is used because of the high rotation speeds of the actuator 5.

Optionally, the optical element 9 of the protection device 3 may also comprise an integrated de-icing or demisting system, such as a de-icing filament or resistance for example, to ensure that the driving aid system 1 operates correctly regardless of the weather conditions.

Optionally, the optical element 9 of the protection device 3 may be coupled to a system (such as a piezoelectric transducer) for causing this optical element 9 to vibrate, in order to prevent the adhesion of soiling to the outer surface of this optical element 9.

These examples of embodiment are provided by way of illustration and are not limiting. In fact, a person skilled in the art may, without departing from the scope of the invention, replace the actuator 5 described here with any other type of actuator that may be used to make the optical element 9 rotate. Additionally, a person skilled in the art may use a transparent optical element 9 with an outer surface having other properties that allow the adhesion of the soiling to this outer surface to be limited without departure from the scope of the present invention. Moreover, it is entirely possible for a person skilled in the art, without departure from the scope of the present invention, to use any type of coupling means 7 to make the optical element 9 rotate, these coupling means 7 possibly being mechanical or magnetic.

Thus, the fast and effective cleaning of an optical sensor 13, which may be a camera for example, designed to be fitted to a motor vehicle, is possible because of the protection device 3 of the present invention, which comprises a rotatably mounted optical element 9 whose axis of rotation coincides with the optical axis 15 of the optical sensor 13. The rotation of the optical element causes the soiling to be removed by the action of the centrifugal force to which the soiling is subjected. The fact that the axis of rotation of the optical element 9 coincides with the optical axis 15 of the optical sensor 13 enables this system to be adapted to any type of camera designed to be integrated into bodywork parts 2 of a motor vehicle or installed on the outside of the vehicle, while retaining a wide field of vision.

The invention claimed is:

1. A driving aid system for a motor vehicle, the driving aid system comprising:
  an optical sensor,
  a device for protecting the optical sensor, the device being fixed to the optical sensor and comprising:
    a transparent optical element having a symmetry of revolution and mounted rotatably around an axis of rotation, the optical element being configured to be arranged upstream of the optical sensor so that the axis of rotation of the optical element coincides with the optical axis of the optical sensor;
    an actuator coupled to the optical element for making the optical element rotate, to enable soiling to be removed by a centrifugal effect, and
  an electronic control unit configured to activate the actuator in order to make the optical element rotate,
  wherein the protection device comprises a capacitive proximity sensor connected to the electronic control unit and configured to detect the approach of another object in the proximity of the optical element, and to enable the electronic control unit to command the automatic stopping of the actuator, in order to halt the rotation of the optical element when another object approaches.

2. The driving aid system as claimed in claim 1, wherein the actuator comprises an electric motor for driving the optical element.

3. The driving aid system as claimed in claim 2, wherein said electric motor is configured to make the optical element rotate at a speed of between 7000 and 15000 r.p.m.

4. The driving aid system as claimed in claim 1, wherein the actuator is coupled to the optical element by coupling means selected from the group consisting of: a belt, gearing, a resilient drive cylinder, and a roller.

5. The driving aid system as claimed in claim 1, wherein the optical element has an outer surface having at least one of the properties selected from the group consisting of: hydrophobic, photocatalytic, superhydrophobic, oleophobic, hydrophilic, and superhydrophilic.

6. The driving aid system as claimed in claim 1, wherein the optical element is formed by an outer lens of the objective lens of the optical sensor.

7. The driving aid system as claimed in claim 1, wherein the optical element is separate from the objective lens of the optical sensor.

8. The driving aid system as claimed in claim 7, wherein the optical element is connected to a fixing frame configured to receive the optical sensor.

9. The driving aid system as claimed in claim 1, wherein the optical element is flat.

10. The driving aid system as claimed in claim 1, wherein the optical element is convex.

11. The driving aid system as claimed in claim 1, further comprising at least one nozzle for projecting a fluid onto the optical element.

12. The driving aid system as claimed in claim 1, further comprising at least one bearing configured to enable the optical element rotate relative to the optical sensor.

13. The driving aid system as claimed in claim 1, wherein the electronic control unit is configured to control the actuator so as to adapt the rotation speed of the optical element according to the speed of movement of the motor vehicle.

14. The driving aid system as claimed in claim 13, wherein the actuator is configured to reduce the rotation speed of the optical element when the speed of the vehicle increases.

15. The driving aid system as claimed in claim 1, wherein the electronic control unit is configured to actuate the projection of at least one fluid onto the optical element when the optical sensor detects the presence of soiling in its field of view.

16. The driving aid system as claimed in claim 15, wherein the electronic control unit is configured to actuate the projection of two different fluids, such as cleaning liquid and compressed air, consecutively.

* * * * *